US005156871A

United States Patent [19]

Goulet et al.

[11] Patent Number: 5,156,871

[45] Date of Patent: Oct. 20, 1992

[54] LOW COST BEVERAGE CARBONATING APPARATUS AND METHOD

[75] Inventors: Douglas P. Goulet, Big Lake; Elvis S. Zimmer, Princeton, both of Minn.

[73] Assignee: IMI Cornelius Inc., Anoka, Minn.

[21] Appl. No.: 693,887

[22] Filed: May 1, 1991

[51] Int. Cl.[5] ........................... A23L 2/00; B01F 3/00

[52] U.S. Cl. .................................. 426/477; 99/323.1; 261/DIG. 7; 426/519

[58] Field of Search .............................. 426/477, 519; 261/DIG. 7, 81; 99/287, 323.1; 366/114

[56] References Cited

U.S. PATENT DOCUMENTS 4,808,349 2/1989 Rudick ............................... 426/477

*Primary Examiner*—George Yeung

*Attorney, Agent, or Firm*—Sten Erik Hakanson

[57] ABSTRACT

An apparatus for providing carbonating of water. The apparatus including a carbonating tank having a carbon dioxide inlet, a water inlet, and a carbonated water outlet. The carbonating tank is pivotally mounted to a rigid structure and connected to an electric motor for providing an undulating or rocking motion of the carbonator about its pivot mounting. The motion of the carbonating tank providing for carbonating of the water held therein.

18 Claims, 1 Drawing Sheet

LOW COST BEVERAGE CARBONATING APPARATUS AND METHOD

BACKGROUND OF THE INVENTION

1. Field of the Invention

The present invention relates generally to beverage dispensing equipment and, in particular, to carbonating systems for beverage dispensing apparatus.

2. Background of the Invention

Post-Mix beverage dispensing equipment generally includes a carbonating tank for producing carbonated water. Such carbonating tanks typically have a still water inlet and a carbon dioxide inlet, as well as a carbonated water outlet for delivery of the carbonated water to a dispensing valve or valves. A high level of carbonation is generally desirable and a water pump is often employed for pumping the still water into the carbonation tank to provide the pressure head necessary for adequate carbonation. In high volume beverage dispensing environments, such as bottling plants or fast food restaurants, the size or cost of equipment to pressurize the carbonation tank is not a significant factor. However, beverage dispensing equipment is increasingly finding applications in low volume environments, such as private offices, and small retail outlets. The cost and size of equipment designed for such applications is always of prime concern. Therefore, a beverage dispensing apparatus that provides for high levels of carbonation, yet at a cost substantially lower than through the use of conventional carbonating systems, would be highly desirable.

SUMMARY OF THE INVENTION

The carbonating system of the present invention includes a pivotally mounted carbonating tank having a water inlet, an inlet for connecting to a pressurized source of carbon dioxide, a carbon dioxide vent outlet, and a carbonated water outlet. An electric motor is connected to the tank by an off-set or rocking mechanism for imparting a regular synchronous wave movement to the water in the tank.

As is known in the art, agitation of carbonated water results in release of the carbon dioxide dissolved therein. However, in the present invention the carbonation levels were found to be significantly improved by a gentle rocking motion being imparted to the carbonator and, hence the water contained therein. Specifically, a wave motion is created that provides for increased carbonation of the water above what would be provided by the pressure of the carbon dioxide alone.

As is known in the art, water is more easily carbonated at lower temperatures. Thus, in the preferred form of the present invention, the electric motor that imparts the motion to the carbonator also includes a fan for providing a circulation of cooled air from an evaporator over the pivotally mounted carbonating tank. As a further cooling strategy, the carbonating tank water inlet is connected to a source of pre-cooled water, such as heat exchange tubing extending in a serpentine fashion through an ice bank. The use of pre-cooled water further enhances the ability of the present invention to attain satisfactory levels of water carbonation.

DESCRIPTION OF THE DRAWINGS

A better understanding of the structure, operation, and objects and advantages of the present invention can be had in view of the following detailed description, which refers to the following figure, wherein.

DETAILED DESCRIPTION OF THE PREFERRED EMBODIMENT

Figure 1:
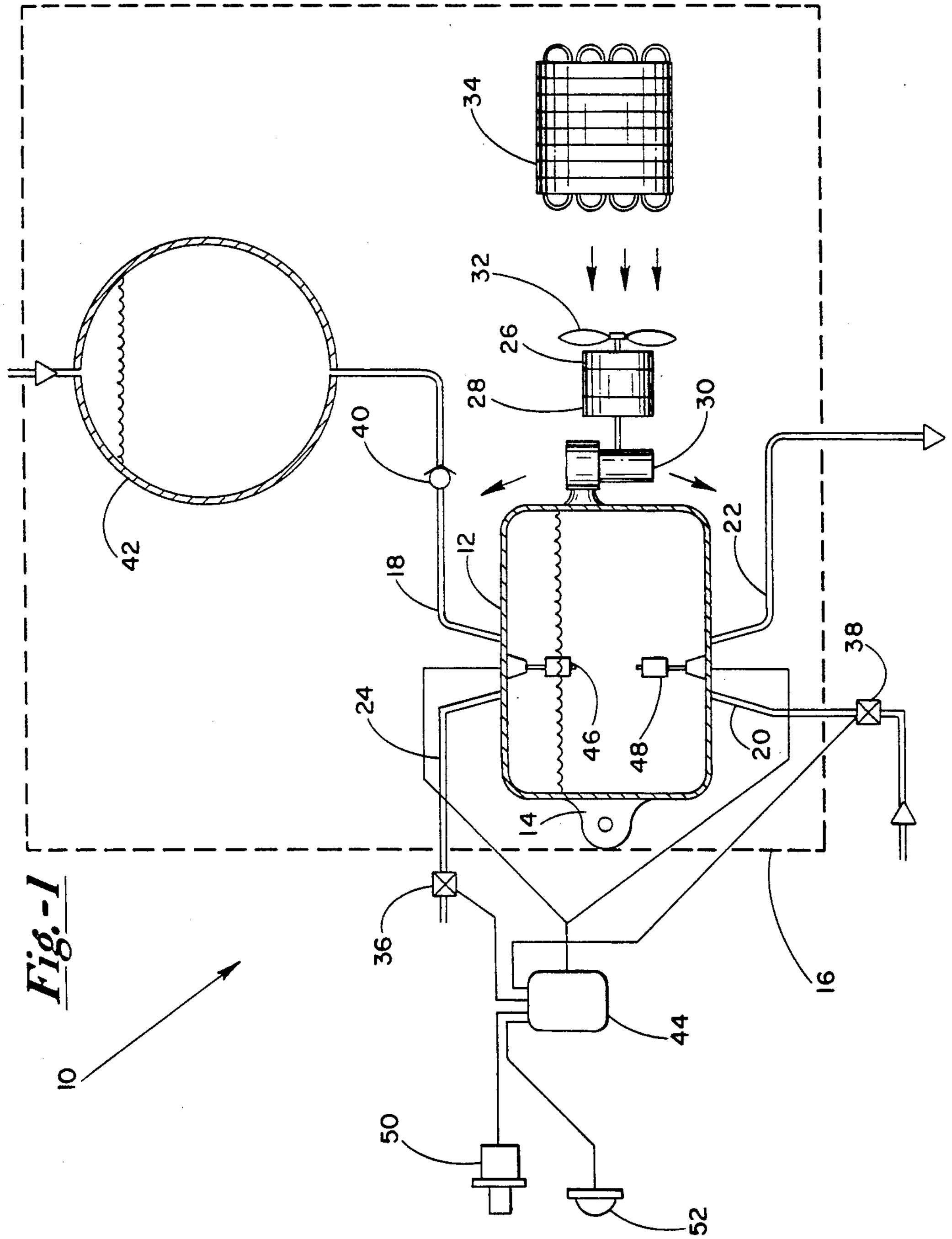
FIG. 1 shows a schematic representation of the present invention.

The carbonating apparatus of the present invention is seen in FIG. 1 and generally referred to by the numeral 10. Carbonating apparatus 10 includes a carbonator 12 and a pivotal mounting means 14 secured to the rigid structure of apparatus 10, such as a wall of a housing 16, shown in phantom outline. Carbonator 12 includes a water inlet 18, a carbon dioxide inlet 20, a carbonated water outlet 22, and a carbon dioxide vent outlet 24. An electric motor 26 includes a reduction drive 28 for connecting to a reciprocating means 30, which reciprocating means 30 is secured to carbonating tank 12. Motor 26 further includes a fan 32 being positioned adjacent an evaporator or cooling coil 34. As is understood by those of skill in the art, evaporator 34 is connected to a further refrigeration apparatus, such as a compressor and condenser (not shown). Vent outlet 24 includes a carbon dioxide vent solenoid 36. Inlet 20 includes a carbon dioxide control valve 38, and is connected to a source of pressurized carbon dioxide (not shown). Water inlet 18 includes a check valve 40 which is connected to a precooling tank 42. Tank 42 is, in turn, connected to a source of potable water (not shown). Tank 42 is cooled, as for example, by placement in a refrigerated air space. Carbonated water outlet 22 is connected to a plurality of beverage or carbonated water dispensing valves (not shown).

A control 44 is connected to an upper liquid level switch 46 and a lower liquid level switch 48. Control 44 is also connected to vent solenoid 36, carbon dioxide solenoid 38, a manual regeneration switch 50, and a low carbonated water indicator light 52.

In operation, cooling tank 42 provides for the delivery of precooled water through inlet 18 into tank 12. As is understood in the art, check valve 40 prevents the reverse flow of carbonated water from tank 12 through inlet 18 towards the potable water source. When a sufficient volume of carbonated water has been withdrawn from carbonating tank 12, as sensed by low level sensor 48, control 44 closes carbon dioxide solenoid 38 and opens vent solenoid 36. As the water pressure from the potable water source is typically much lower than the carbon dioxide gas pressure, it can be appreciated that the coordinated closing of valve 38 and opening of valve 36 will permit the flow of water into tank 12. When sensor 46 indicates a sufficient volume of water in tank 12, control 44 then provides for the closing of valve 36 and the opening of valve 38.

Operation of motor 26, through reduction drive 28, serves to provide for a relatively slow oscillating or reciprocating movement of tank 12 about pivot 14. Thus, the carbon dioxide and water are gently mixed, in a manner below the level of agitation that would result in a release of carbon dioxide from the water, that instead provides for facilitating or enhancing the carbonation level of the resulting carbonated water. For example, in a cylindrical carbonation tank having an approximate internal volume of 3.5 liters, it was found, that pivoting movement about one end thereof through a total arc of approximately 30 degrees at 60 cycles per minute provided for a carbonation level of 3.8 volumes at 38 degrees temperature. One cycle being travel of the carbonator from, for example, a low point 15 degrees below to a high point 15 degrees above level and back to the low point. This carbonation level could be maintained with a flow rate of 400 oz. per hour. Moreover, in the present example, control 44 provided for oscillating of the carbonator five minutes each time sensor 48 signals control 44 to replenish carbonator 12 with water. The particular point of maximum carbonation is, of course, highly dependent upon the volume and structure of the carbonation tank; however, it is believed that the optimum carbonation is achieved in a manner substantially synchronous time of propagation of a wave movement of the water from one end of the tank to the other. It will be apparent to those of skill that many other cycling time approaches could be used depending upon design requirements. In particular, a constant cycling could be employed. The cyclical speed that yields maximum carbonation is, of course, highly dependent upon the volume and structure of the carbonation tank; however, it is believed that the optimum carbonation is achieved wherein the time required to move from a high position to a low one, or vice-versa, is substantially synchronous with the time it takes for a wave propagated by such motion to move from one end of the tank to the other.

In addition, the present invention can optionally include the cooling fan 32 for providing a circulation of cooled air from evaporator 34 across carbonating tank 12. In this manner, the carbonation level can be further enhanced. It will also be understood that the carbonation level can be further improved by providing pre-cooling of the water supply to tank 12, such as through the use of pre-cooling tank 42. Various other pre-cooling means can be used, such as a length of heat exchange tube extending in a serpentine fashion through an ice bank. It can be appreciated by those of skill that carbonation system 10 is most advantageously used in combination with a complete beverage dispensing equipment wherein such an ice bank is typically included.

As will be understood by those of skill in the art, various modifications can be made to the present invention and still remain within the scope thereof. For example, the point of pivotal attachment of the carbonating tank and the particular dimensions thereof are a matter of design choice.

We claim:

1. An apparatus for carbonating water, comprising: a carbonating tank, the carbonating tank having a first inlet for connecting to a source of pressurized carbon dioxide, a second inlet for connecting to a pressurized source of potable water, a carbonated water outlet for connecting to one or more valve means for dispensing carbonated water produced in the tank, means for regulating filling of the tank with the potable water in response to the withdrawal of water from the carbonating tank, and pivot support means for the carbonating tank for retaining the carbonating tank so that it can be moved in a reciprocating manner about an axis, and a drive means connected to a reciprocating means and the reciprocating means connected to the carbonating tank so that operating of the drive means provides for imparting a reciprocating motion to the carbonating tank about the axis so that motion is imparted to the water held within the carbonating tank for facilitating carbonating of the water.

2. The carbonating apparatus as defined in claim 1, and the means for regulating filling comprising water valve means connected to the water inlet, carbon dioxide valve means connected to the carbon dioxide inlet and a vent valve connected to a vent outlet of the carbonating tank and the carbonating tank having high and low water level sensing means, and control means, the control means connected to the high and low sensing means and to the water, carbon dioxide and vent valves for providing operating thereof in response to the level sensed by the level sensing means for regulating the filling of the carbonating tank with water.

3. The carbonating apparatus as defined in claim 1, and further including means for cooling the carbonating tank.

4. The carbonating apparatus as defined in claim 1, and further including means for pre-cooling the potable water delivered to the carbonating tank water inlet.

5. The carbonating apparatus as defined in claim 1, and the carbonating tank being elongate and extending from a first end to a second end and the pivot support means secured to the tank first end and to a support structure.

6. An apparatus for carbonating water, comprising: a carbonating tank, the carbonating tank having a first inlet for connecting to a source of pressurized carbon dioxide, a second inlet for connecting to a source of potable water, a carbonated water outlet for connecting to one or more valve means for dispensing carbonated water produced in the tank, means for regulating filling of the tank with the potable water in response to the withdrawal of carbonated water from the tank, the means for regulating filling comprising water valve means connected to the water inlet, carbon dioxide valve means connected to the carbon dioxide inlet and a vent valve connected to a vent outlet of the carbonating tank and the carbonating tank having high and low water level sensing means, and control means, the control means connected to the high and low sensing means, to the water valve means, and to the carbon dioxide and vent valves for providing operating thereof in response to the level sensed by the level sensing means for regulating the filling of the carbonating tank with water, and pivot support means for the carbonating tank for retaining the carbonating tank so that it can be moved in a reciprocating manner about an axis, and a drive means connected to a reciprocating means and the reciprocating means connected to the carbonating tank so that operating of the drive means provides for imparting a reciprocating motion to the carbonating tank about the axis so that motion is imparted to the water held within the carbonating tank.

7. The carbonating apparatus as defined in claim 6, and further including means for cooling the carbonating tank.

8. The carbonating apparatus as defined in claim 6, and further including means for pre-cooling the potable water delivered to the carbonating tank water inlet.

9. The carbonating apparatus as defined in claim 6, and the motion imparting means comprising a pivotal support means for the carbonating tank and drive means connected to the carbonating tank for moving the carbonating tank about the pivotal support.

10. The carbonating apparatus as defined in claim 2, and further including means for cooling the carbonating tank.

11. The carbonating apparatus as defined in claim 10, and further including means for pre-cooling the potable water delivered to the carbonating tank water inlet.

12. A method for carbonating water, comprising the steps of: pivotally securing a carbonating tank to a support structure, filling the carbonating tank partially with water, applying a head of pressurized carbon dioxide to the water held within the carbonating tank, and moving the carbonating tank in a reciprocating motion about an axis for imparting a motion to the water within the carbonator for facilitating carbonating of the water.

13. The method as defined in claim 12, and the carbonating tank being elongate and extending from a first end to a second end, and the tank pivotally secured on the tank first end to a support structure wherein the tank extends in a substantially horizontal orientation and the tank moved in a reciprocating motion between a low position and a high position about a horizontal axis extending through the pivotally secured first end in a direction substantially transverse to the extension of the tank.

14. The method as defined in claim 13, and the reciprocating motion providing for propagating a wave in the water held in the carbonating tank, the wave flowing alternately between the ends of the tank as the tank is reciprocated about the horizontal axis between the high and low positions.

15. The method as defined in claim 14, wherein the carbonating tank is moved in a reciprocating motion at a rate wherein the time required for a wave to be propagated from either tank end to the opposite tank end is substantially equal to the time that is required to move the tank between the high and low positions.

16. An apparatus for carbonating water, comprising: a carbonating tank, the carbonating tank having a first inlet for connecting to a source of pressurized carbon dioxide, a second inlet for connecting to a pressurized source of potable water, and a carbonated water outlet, pivot support means for the carbonating tank for retaining the carbonating tank so that it can be moved in a reciprocating manner about an axis, and a drive means connected to a reciprocating means and the reciprocating means connected to the carbonating tank so that operating of the drive means provides for imparting a reciprocating motion to the carbonating tank about the axis so that motion is imparted to the water held within the carbonating tank for facilitating carbonating of the water.

17. The carbonating apparatus as defined in claim 16, and the carbonating tank being elongate and extending from a first end to a second end and the pivot support means secured to the tank first end and to a support structure wherein the tank extends in a substantially horizontal orientation and is reciprocated between a low position and a high position about the axis, the axis being a horizontal axis extending through the pivot means in a direction substantially transverse to the extension of the tank wherein operating of the drive means and reciprocating means provides for operating the carbonating tank so that a wave is propagated in the water therein, the wave flowing alternately between the ends of the tank as the tank is reciprocated about the horizontal axis between the high and low positions.

18. The apparatus as defined in claim 17, and further comprising control means connected to the drive means for reciprocating the carbonating tank at a rate wherein the time required for a wave to be propagated from either tank end to the opposite tank end is substantially equal to the time that is required to move the tank between the high and low positions.

* * * * *